(12) United States Patent
Takahashi et al.

(10) Patent No.: US 11,762,151 B2
(45) Date of Patent: Sep. 19, 2023

(54) OPTICAL RADAR DEVICE

(71) Applicant: SHARP KABUSHIKI KAISHA, Sakai (JP)

(72) Inventors: Koji Takahashi, Sakai (JP); Peter John Roberts, Oxford (GB)

(73) Assignee: SHARP KABUSHIKI KAISHA, Sakai (JP)

( * ) Notice: Subject to any disclaimer, the term of this patent is extended or adjusted under 35 U.S.C. 154(b) by 992 days.

(21) Appl. No.: 16/671,622

(22) Filed: Nov. 1, 2019

(65) Prior Publication Data

US 2020/0142072 A1 May 7, 2020

Related U.S. Application Data

(60) Provisional application No. 62/757,148, filed on Nov. 7, 2018.

(51) Int. Cl.
| | |
|---|---|
| *G02B 6/32* | (2006.01) |
| *G01S 17/894* | (2020.01) |
| *G01S 7/481* | (2006.01) |
| *G02B 5/28* | (2006.01) |
| *G02B 23/12* | (2006.01) |

(52) U.S. Cl.
CPC .............. *G02B 6/32* (2013.01); *G01S 7/4816* (2013.01); *G01S 17/894* (2020.01); *G02B 5/28* (2013.01); *G02B 5/285* (2013.01); *G01S 7/4811* (2013.01); *G02B 23/12* (2013.01)

(58) Field of Classification Search
None
See application file for complete search history.

(56) References Cited

U.S. PATENT DOCUMENTS

| 5,696,577 | A | 12/1997 | Stettner et al. | |
|---|---|---|---|---|
| 5,892,575 | A | 4/1999 | Marino | |
| 8,130,367 | B2 | 3/2012 | Stettner et al. | |
| 10,445,896 | B1* | 10/2019 | Bills | H04N 5/353 |
| 10,948,572 | B2* | 3/2021 | Pacala | G01S 17/89 |

(Continued)

FOREIGN PATENT DOCUMENTS

| EP | 3333611 A1 * | 6/2018 | ......... G02B 21/0064 |
|---|---|---|---|
| JP | 2015-078953 A | 4/2015 | |

(Continued)

OTHER PUBLICATIONS

Machine translation of EP-3333611-A1 (Year: 2018).*

(Continued)

*Primary Examiner* — Yuqing Xiao
*Assistant Examiner* — Brian Zawacki
(74) *Attorney, Agent, or Firm* — ScienBiziP, P.C.

(57) ABSTRACT

[Object] To provide a technology in flash LiDAR applicable to a wide incidence-angle range.

[Solution] An optical radar device (100) includes a light emitting unit (110) that diffusively radiates a laser beam, an arrayed light receiving unit (120) that receives the laser beam emitted from the light emitting unit (110) and reflected off an object whose range is to be determined (10), the arrayed light receiving unit (120) including light receiving elements arrayed two-dimensionally, and a telecentric lens (140) disposed between the object whose range is to be determined and the light receiving element.

7 Claims, 11 Drawing Sheets

(56) References Cited

U.S. PATENT DOCUMENTS

| | | | | |
|---|---|---|---|---|
| 2014/0350836 A1* | 11/2014 | Stettner | .................. | G01S 7/481 |
| | | | | 356/4.01 |
| 2019/0195688 A1* | 6/2019 | Atabaki | .................... | G01J 3/44 |
| 2020/0034644 A1* | 1/2020 | Paesen | ................... | G01S 7/4816 |
| 2020/0103526 A1* | 4/2020 | Morcom | ............... | G01S 7/4863 |
| 2021/0242354 A1* | 8/2021 | Wang | .................... | H01L 31/105 |

FOREIGN PATENT DOCUMENTS

| | | | | |
|---|---|---|---|---|
| KR | 20170109004 A | * | 9/2017 | ......... G01B 11/2518 |
| WO | WO-2015004213 A1 | * | 1/2015 | ............... G01C 7/04 |

OTHER PUBLICATIONS

Machine translation of KR-20170109004-A (Year: 2017).*
Cristiano Niclass et al., "A 0.18-µm CMOS SoC for a 100-m-Range 10-Frame/s 200 × 96-Pixel Time-of-Flight Depth Sensor" IEEE Journal of Solid-State Circuits, vol. 49, No. 1, Jan. 2014; p. 315-330.

* cited by examiner

FIG. 1

10: TARGET OBJECT
100: OPTICAL RADAR DEVICE
101: SENSOR
110: LIGHT EMITTING UNIT
111: SENSOR
120: ARRAYED LIGHT RECEIVING UNIT
130: TOF SENSOR DEVICE
140: TELECENTRIC LENS
150: BANDPASS FILTER
155: ACTUATOR
160: CONTROL UNIT

120: LIGHT RECEIVING UNIT
121: SIGNAL STORING PROCESSING UNIT
122: COLUMN SELECTION CIRCUIT
123: MEMORY SELECTION CIRCUIT
124: CONTROL SIGNAL, POWER SUPPLY, CLK
125: THREE-DIMENSIONAL PIXEL DEVICE
Bx(j): BUFFER MEMORY
C(j): ROW SIGNAL LINE
D(i, j), G1(i, j), G2(i, j): OUTPUT SIGNAL
DS: SIGNAL PROCESSING CIRCUIT
Lx(j): SIGNAL LINE
Mx(j): PIXEL STORAGE DEVICE
Px(i, j): PIXEL
R(i): COLUMN SELECTION LINE
Rm(α): MEMORY SELECTION LINE

FIG. 4A

130: TOF SENSOR DEVICE
140: TELECENTRIC LENS
150: BANDPASS FILTER
170: APERTURE STOP

FIG. 4B

130: TOF SENSOR DEVICE
150: BANDPASS FILTER

--PRIOR ART--

FIG. 6A

150: BANDPASS FILTER

FIG. 6B

150: BANDPASS FILTER

150: BANDPASS FILTER

OPTICAL RADAR DEVICE

TECHNICAL FIELD

The present invention relates to an optical radar device that acquires information on a distance to an object whose range is to be determined.

BACKGROUND ART

These days, a technology of acquiring information on a distance to a target has been increasingly important as an environment recognition technology for automobiles, robots, and other devices. Particularly, as a method of long-distance information measurement, a method of radiating a laser beam to a target and measuring time-of-flight from when the laser beam is reflected off the target until when the laser beam is returned has been widely spread, and referred to as light detection and ranging or laser imaging detection and ranging (LiDAR).

Examples of a method of radiating laser beams include scanning LiDAR, for scanning a target with focused (refer to NPL 1) or band-shaped (refer to PTL 1) laser beams using a mirror or another device, and flash LiDAR, for collectively and radiating uniformly and two-dimensionally widened laser beams.

Many scanning LiDAR systems that can acquire high beam intensity on the target have been developed these days, but they are large-sized and expensive to involve a mechanical system for scanning a target with a laser beam. A flash LiDAR system, on the other hand, facilitates size reduction without involving a mechanical system for scanning a target with a laser beam. However, a flash LiDAR system emits a laser beam of weaker intensity to a target than a scanning LiDAR system. Thus, the signal intensity decreases when the distance to a target increases, so that the distance measurement accuracy degrades. To address this, flash LiDAR particularly requires a sensitivity improvement technology of reducing noise due to background light.

Examples of a time-of-flight measurement include a method of radiating pulse laser beams multiple times, repeating measurement of time from light emission to light reception to form a histogram (horizontal axis represents time, and vertical axis represents frequency), and statistically determining time-of-flight to directly connect the time measurement accuracy to the distance accuracy (this method is referred to as time-correlated single photon counting (TCSPC)). Here, a single-photon avalanche diode (SPAD) is used as a light receiving element (refer to PTL 2 and NPL 1).

Flash LiDAR enables capturing of a depth map (three-dimensional image) with single laser radiation, and secures simultaneity over the entire field of view as if an image is captured with flashlight in photographing. In scanning LiDAR, different points in the field of view are measured at different time points, whereas in flash LiDAR, all the points are measured at the same time point (refer to PTL 3 and PTL 4).

CITATION LIST

Patent Literature

PTL 1: Japanese Unexamined Patent Application Publication No. 2015-78953
PTL 2: U.S. Pat. No. 5,892,575
PTL 3: U.S. Pat. No. 5,696,577
PTL 4: U.S. Pat. No. 8,130,367

Non Patent Literature

NPL 1: IEEE JOURNAL OF SOLID-STATE CIRCUITS, VOL. 49, NO. 1, JANUARY 2014, PP 315-330 "A 0.18-m CMOS SoC for a 100-m-Range 10-Frame/s 200 96-Pixel Time-of-Flight Depth Sensor." Cristiano Niclass, Member, IEEE, Mineki Soga, Hiroyuki Matsubara, Masaru Ogawa, and Manabu Kagami, Member, IEEE

SUMMARY OF INVENTION

Technical Problem

However, flash LiDAR in the existing technology described above has a first problem in that it is not applicable to a wide incidence-angle range.

The existing technologies described above, either flash LiDAR or scanning LiDAR, have a second problem in view of preferable filtering.

An aspect of the present invention is to solve the above first problem, and aims to provide a technology in flash LiDAR applicable to a wide incidence-angle range.

Another aspect of the present invention is to solve the above second problem, and aims to provide a technology in flash LiDAR or scanning LiDAR that enables preferable filtering.

Solution to Problem (1) To solve the above problems, an optical radar device according to an aspect of the present invention includes a light emitting unit that diffusively radiates a laser beam; a light receiving unit that receives the laser beam emitted from the light emitting unit and reflected off an object whose range is to be determined, the light receiving unit including light receiving elements arrayed two-dimensionally; and a telecentric lens disposed between the object whose range is to be determined and the light receiving element.

(2) An optical radar device according to another aspect of the present invention may include, besides the structure of the paragraph (1) above, a bandpass filter disposed closer to the light receiving elements than the telecentric lens.

(3) In an optical radar device according to another aspect of the present invention, besides the structure of the paragraph (1) or (2) above, the bandpass filter may have filter characteristics that differ from point to point in a plane of the bandpass filter, and the optical radar device may include a control unit that controls a position of the bandpass filter on the basis of a signal from a sensor that detects a state of the optical radar device.

(4) To solve the above problems, an optical radar device according to another aspect of the present invention include a light emitting unit that radiates a laser beam; a light receiving unit that receives the laser beam emitted from the light emitting unit and reflected off an object whose range is to be determined, the light receiving unit including a light receiving element; and a bandpass filter disposed between the object whose range is to be determined and the light receiving element. The bandpass filter has filter characteristics that differ from point to point in a plane of the bandpass filter, and the optical radar device further includes a control unit that controls a position of the bandpass filter on the basis of a signal from a sensor that detects a state of the optical radar device.

(5) In an optical radar device according to another aspect of the present invention, besides the structure of any one of the paragraphs (1) to (4) above, the signal from the sensor may be a signal representing an environmental temperature of an environment in which the optical radar device is installed.

(6) In an optical radar device according to another aspect of the present invention, besides the structure of any one of the paragraphs (1) to (5) above, the signal from the sensor may be a signal representing a temperature of a semiconductor laser device that radiates the laser beam.

(7) In an optical radar device according to another aspect of the present invention, besides the structure of any one of the paragraphs (1) to (6) above, filter characteristics of the bandpass filter may change continuously or stepwise in one direction in a plane of the bandpass filter.

(8) In an optical radar device according to another aspect of the present invention, besides the structure of any one of the paragraphs (1) to (7) above, the bandpass filter may be divided into a plurality of segments that have different transmissive wavelength ranges.

(9) In an optical radar device according to another aspect of the present invention, besides the structure of any one of the paragraphs (1) to (8) above, the bandpass filter may be formed from a dielectric multilayer film including layers at least one of which has a thickness that changes in the plane.

Advantageous Effects of Invention

An aspect of the present invention can provide a technology in flash LiDAR applicable to a wide incidence-angle range.

Another aspect of the present invention enables preferable filtering in either flash LiDAR or scanning LiDAR.

DESCRIPTION OF EMBODIMENTS (Existing Technology and Exploratory Structure Example)

Before specifically describing an embodiment of the present invention, an existing technology and an exploratory structure for the present embodiment will be described, below.

In the existing technology, an example frequently used as light receiving elements is a silicon (Si) device that is inexpensive and capable of being integrated with peripheral circuits. An example usable as a laser beam is infrared light around the range of 900 to 950 nm receivable by a Si-made light receiving element, and an example usable as a laser beam light source is a semiconductor laser.

Here, when light receiving elements are to receive a laser beam returned thereto after being reflected off a target, background light superimposed on the returned laser beam functions as noise to degrade the distance measurement accuracy. To block only the background light to receive only the laser beam returned after reflection, the light receiving elements are preferably provided with a bandpass filter that allows only a laser beam to pass therethrough. A bandpass filter having a narrower transmissive wavelength range can more effectively remove noise.

Particularly, using a bandpass filter with a narrow line width in flash LiDAR in which a signal reflected off a target has weak intensity is effective in long distance measurement. Removing background light is also effective in scanning LiDAR to improve the distance measurement accuracy. Bandpass filters are usually formed from dielectric multilayer films.

Thus far, bandpass filters have the following problem. Specifically, a bandpass filter having a narrow wavelength range is hardly applicable to a wide incidence-angle range, which is characteristic of flash LiDAR. In addition, using a bandpass filter having a narrow line width for a wide temperature range to take into consideration the effect of oscillation wavelength variation between devices has been impractical.

As to the former problem, flash LiDAR diffuses a laser beam in a wide angle range, and receives light returned after being reflected off a target with a two-dimensional light receiving element array (imager) to obtain a depth map. Specifically, laser beams are radiated in various angles and returned from various angles, and thus are incident on a light receiving lens system in an extremely wide range of incidence angle (angle of view or viewing angle). Typically, bandpass filters are formed from dielectric multilayer films. Such filters formed from dielectric multilayer films have filter characteristics (transmissive wavelength range) that are largely dependent on an incidence angle of a light beam incident on the filters. Applying a bandpass filter with a narrow wavelength range to a wide incidence-angle range (angle of view or viewing angle) has thus been impractical.

As to the latter problem, the oscillation wavelength of the semiconductor laser shifts depending on the environmental temperature. Semiconductor lasers emit beams of oscillation wavelengths that vary between devices. Thus, using bandpass filters with a narrow line width over a wide temperature range to take into consideration the effect of oscillation wavelength variation between the devices has been impractical. This is the problem for both flash LiDAR and scanning LiDAR.

The latter problem is a problem that occurs in both flash LiDAR and scanning LiDAR, but in flash LiDAR, the former problem occurs concurrently with the latter problem. Thus, a method for concurrently solving both problems has been desired.

Embodiment 1

An embodiment of the present invention will be described as follows. Hereinbelow, for illustration purposes, components having the same functions as the components described in a specific embodiment may be denoted with the same reference signs without being described.
(Related Components of Optical Radar Device)

Figure 1:
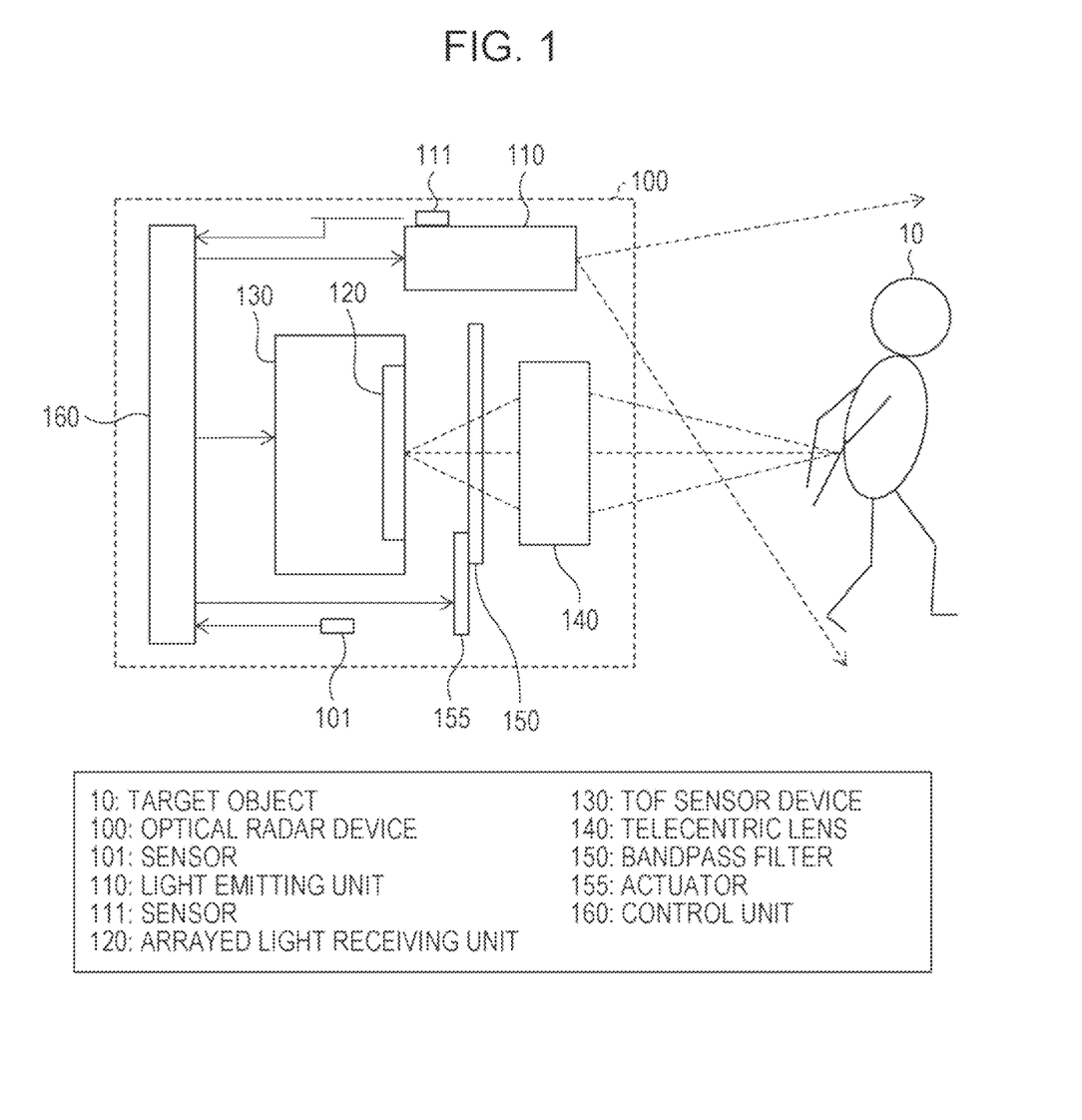
FIG. 1 is a block diagram of related components of an optical radar device according to Embodiment 1 of the present invention.

FIG. 1 is a block diagram of related components of an optical radar device 100 according to the present embodiment. As illustrated in FIG. 1, the optical radar device 100 includes a light emitting unit 110, a light receiving system, and a control unit 160, which controls the light emitting unit 110 and the light receiving system. The light emitting unit 110 diffusively radiates laser beams on an object whose range is to be determined (referred to as a "target object", below), including a movable target, such as people and animals, and an immovable target, such as buildings and trees. In the present application, as illustrated in FIG. 1, a person 10 is described as an example of the target object.

The light receiving system receives the laser beam that has been emitted from the light emitting unit 110 and reflected off the target object. In the present embodiment, the light receiving system includes, as illustrated in FIG. 1, a telecentric lens 140, a bandpass filter 150, an arrayed light receiving unit 120, and a TOF sensor device 130. The arrayed light receiving unit 120 includes an array of light receiving elements, arrayed two-dimensionally. As illustrated in FIG. 1, the bandpass filter 150 is disposed closer to the light receiving elements than the telecentric lens 140.

The telecentric lens 140 includes multiple lenses arranged so that a main light beam passes through a focal point.

Thus, the optical radar device 100 according to the present embodiment relates to flash LiDAR in which the light emitting unit 110 diffusively radiates a laser beam. The optical radar device 100 can reduce background light noise with the bandpass filter 150. The optical radar device 100 can form an image of external information (target object 10) on the two-dimensional light receiving element array of the arrayed light receiving unit 120. The optical radar device 100 radiates a short pulse with a pulse width of several to a few tens of nanometers on the target object 10 using a semiconductor laser emitting a laser beam within a wavelength range of 940 nm as an example of a laser beam. In the optical radar device 100, a laser beam reflected off the target object 10 is formed into an image on the light receiving elements of the arrayed light receiving unit 120 through the light receiving system.

In the optical radar device 100, a laser beam is diffused to be uniformly radiated over a wide range. The light receiving system forms an image of the surroundings within the wide range including the target object 10 on the arrayed light receiving unit 120 formed into a two-dimensional array including the light receiving element.

The TOF sensor device 130 (each pixel) of the arrayed light receiving unit 120 formed into a two-dimensional array contains TOF information, and can obtain a depth map in which each pixel contains distance information. The depth map enables detection of the surrounding three-dimensional target object 10.

An example assumed as the arrayed light receiving unit 120 formed into a two-dimensional array is formed from a two-dimensional array of single-photon avalanche diodes (SPADs), which are highly sensitive light receiving elements.

As illustrated in FIG. 1, the control unit 160 receives measurement signals from a sensor 101 and a sensor 111. For example, the sensor 101 detects an environmental temperature in the environment in which the optical radar device 100 is installed. The sensor 111 detects the temperature of a semiconductor laser device (included in the light emitting unit 110) that radiates a laser beam.
(Structure of TOF Sensor Device)

Figure 3:
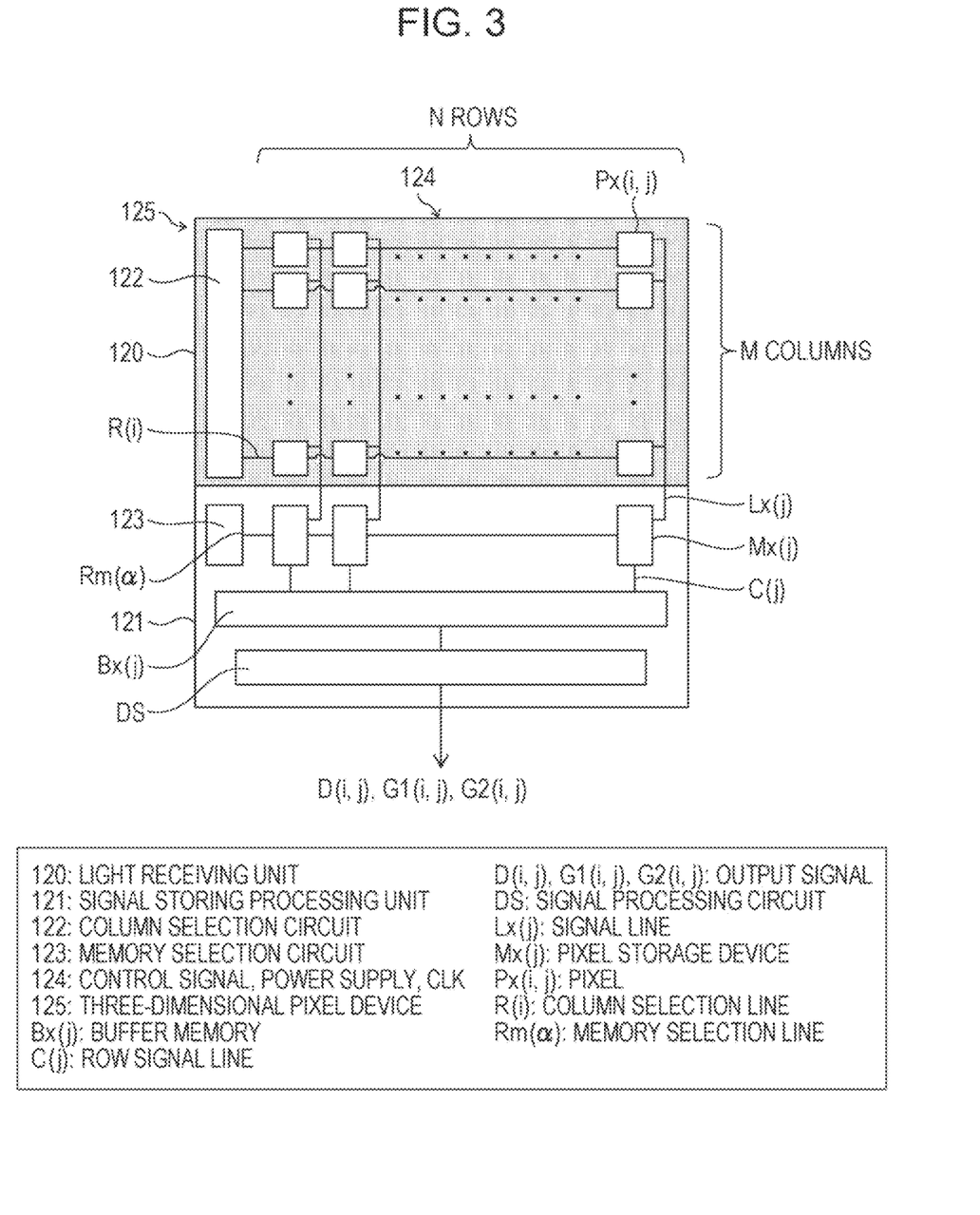
FIG. 3 is a schematic diagram of a TOF sensor device, constituting the optical radar device in FIG. 1 and FIG. 2.

The TOF sensor device 130 constituting the light receiving system will be described below with reference to FIG. 3. FIG. 3 is a schematic diagram of the TOF sensor device 130 constituting the optical radar device 100. The TOF sensor device 130 here is a sensor device that receives a laser beam diffusedly radiated on the target object 10 and reflected off the target object 10, and calculates, through time-of-flight measurement, the distance from the target object 10 to the optical radar device 100.

FIG. 3 illustrates an example of the TOF sensor device 130 (three-dimensional picture element) formed by arranging single-photon avalanche diodes (SPADs) in a two-dimensional array.

The arrayed light receiving unit 120 and a signal storing processing unit 121 of a three-dimensional picture element 125 may be formed on a silicon substrate. The arrayed light receiving unit 120 and the signal storing processing unit 121 may be formed as separate chips, coupled with a vertical via hole or a bump, and laminated together, but they are preferably monolithically formed on the same silicon substrate. FIG. 3 illustrates the arrayed light receiving unit 120 disposed on the upper side and the signal storing processing unit 121 disposed on the lower side. However, this layout is for convenience, and may be, for example, a layout where the arrayed light receiving unit 120 is disposed at a middle portion. However, a layout in which the arrayed light receiving unit 120 and the signal storing processing unit 121 are mixedly disposed is not preferable. The mixed layout increases the range in which the arrayed light receiving unit 120 is disposed and increases the size of components such as the light receiving system, a window that protects the sensor (lid glass), and the bandpass filter, to thus increase the costs.

The arrayed light receiving unit 120 of the three-dimensional picture element 125 includes a two-dimensional matrix of pixels Px (i, j) in M columns and N rows, and an image of the target object is formed on the two-dimensional matrix of the M columns and the N rows through the image-formation optical system. Each pixel has a high sensitivity, and thus a SPAD is preferably used as each pixel. Each pixel has TOF information, and the sensor outputs a two-dimensional depth map.

In the present embodiment, in flash LiDAR, the telecentric lens 140 is used to form an image of the target on the two-dimensional light receiving element array, and an interference filter having its transmissive wavelength range adjustable is used to reduce the background light noise. In the present embodiment, an interference bandpass filter 150 is used as an example of the interference filter regardless of whether it has its transmissive wavelength range adjustable.

Figure 4A:
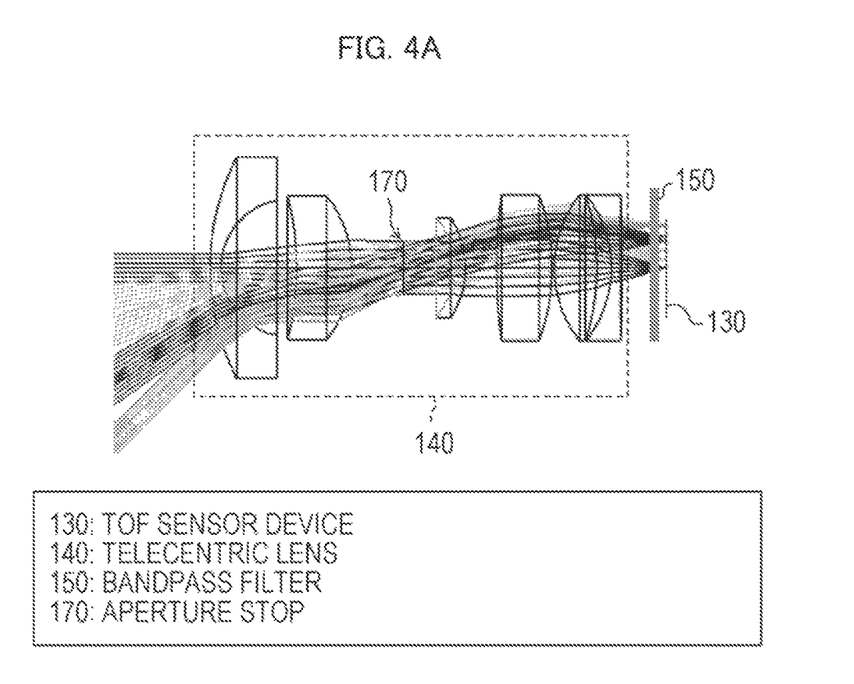
FIG. 4A is a schematic diagram of related components of a light receiving system of the optical radar device in FIG. 1.
Figure 4B:
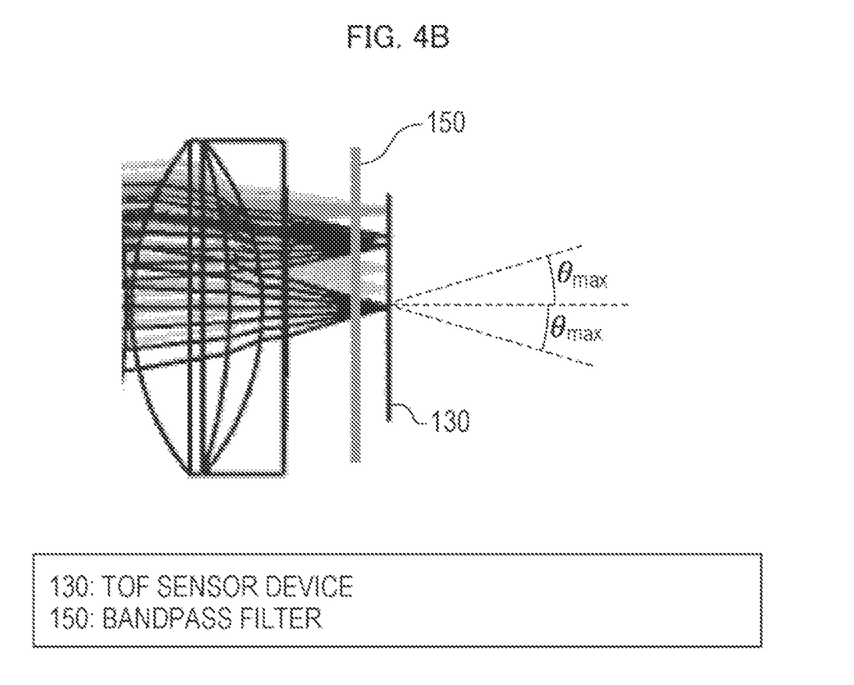
FIG. 4B is a partially enlarged view of FIG. 4A.

FIG. 4A is a schematic diagram of related components of the light receiving system of the optical radar device 100 in FIG. 1, and FIG. 4B is a partially enlarged view of FIG. 4A.

As illustrated in FIGS. 4A and 4B, the interference bandpass filter 150 having a narrow line width used to reduce background light is disposed between the light receiving system (two-dimensional TOF sensor device 130 formed from a SPAD array) and the telecentric lens 140 for image formation. The bandpass filter 150 is arranged parallel to the light receiving surface of the light receiving system.

The inventors of the present application have found that, in flash LiDAR, using the telecentric lens and the interference bandpass filter in combination is extremely effective to widening of an angle of view and noise reduction.

Specifically, the telecentric lens 140, even a lens of a wide angle of view (or wide viewing angle or wide field of view FOV), has a "plane", between the lens system and the light receiving system, that can reduce the incidence angle of a light beam to an extremely small angle. "The plane" is parallel to the light receiving surface of the light receiving system. Generally, the filter characteristics of the interference filter is largely dependent on the incidence angle. However, the interference bandpass filter 150 disposed on "the plane" enables narrowing of the incidence angle of a light beam incident on the bandpass filter 150 to an extremely small angle, regardless of the angle of view of the lens. Thus, the transmissive wavelength range of the bandpass filter 150 can be narrowed in the wide angle of view. In addition, an elemental flat plate-shaped filter can be used as the interference bandpass filter 150. A plate-shaped filter is advantageous in obtaining a highly accurate filter with lowest costs.

Here, the incidence angle of a light beam incident on the bandpass filter 150 changes to a lesser extent even when the incidence angle of a light beam incident on the telecentric lens 140 from the exterior changes largely. Specifically, even a lens having a wide viewing angle can retain high filter efficiency. Thus, the use of the flat plate-shaped filter also facilitates adjustment of the filter characteristics.

Throughout the entire viewing angle, a maximum incidence angle θmax of a light beam with respect to a perpendicular to the flat filter and the light receiving surface is substantially given by the following formula:

$$\theta max = \tan^{-1}[1/(2F\#)].$$

In the case of an actual lens (where F # is greater than 1), θmax is a small value (for example, θmax=26.6° when F #=1, and θmax=14.5° when F #=2). A small incidence angle of a light beam incident on the filter reduces the d angle dependence of the transmissive wavelength range. A small incidence angle of a light beam incident on the light receiving surface represents that unwanted reflected light off the light receiving surface is reduced to a minimum.

(Comparison between Telecentric Lens and Typical Image Forming Lens)

Figure 5A:
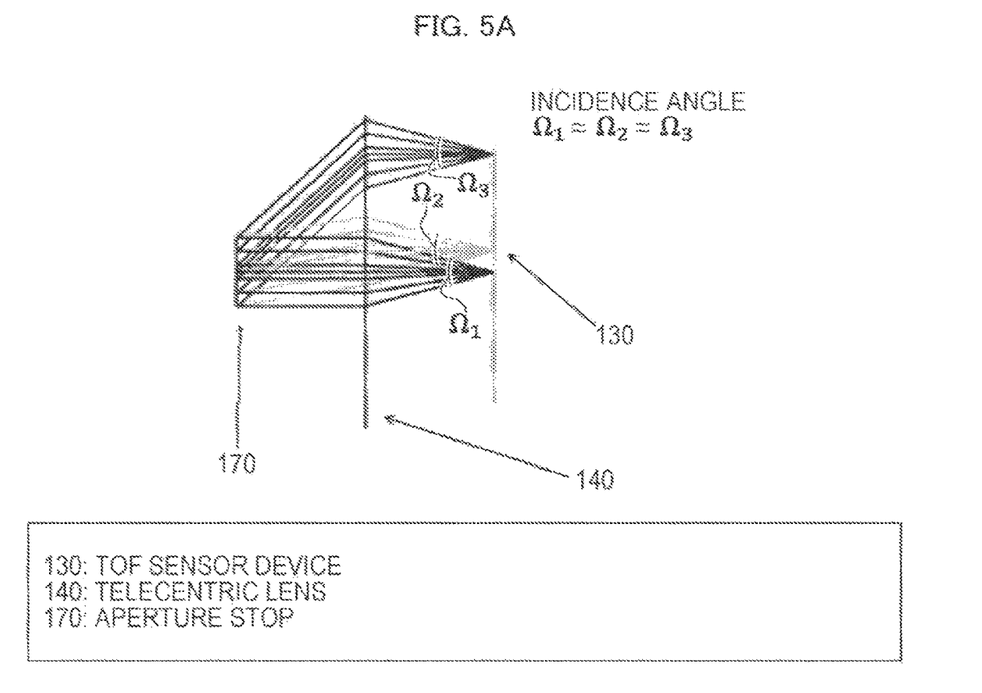
FIG. 5A is a schematic diagram of incidence angles of light beams incident on light receiving elements of the optical radar device illustrated in FIG. 1.
Figure 5B:
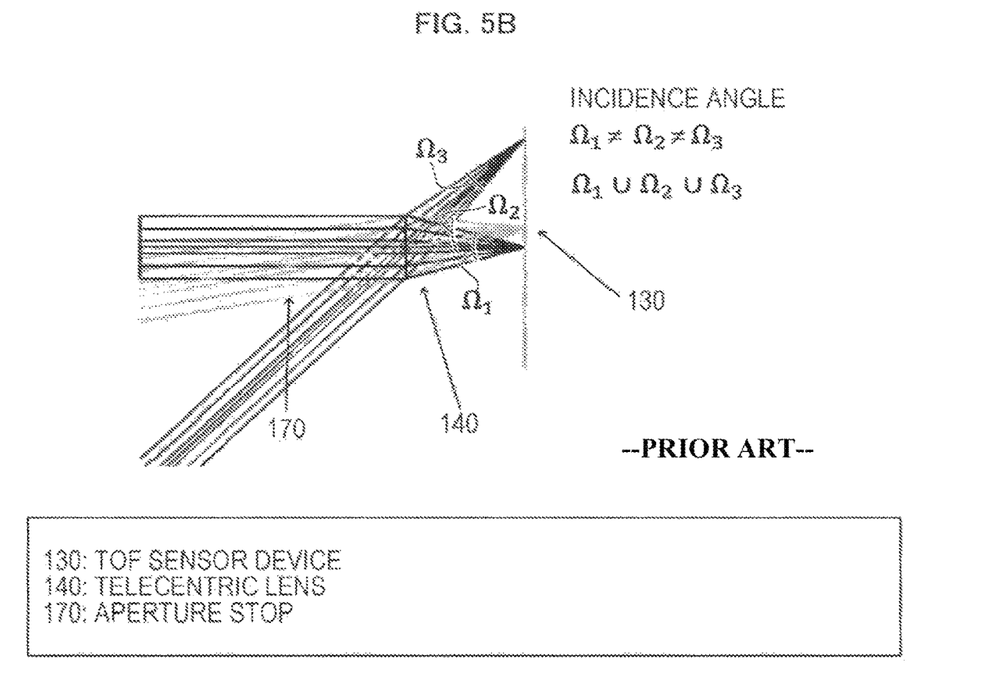
FIG. 5B illustrates incidence angles of light beams for an existing technology in the form corresponding to FIG. 5A.

FIG. 5A is a schematic diagram of incidence angles of light beams incident on the light receiving elements of the optical radar device in FIG. 1, and FIG. 5B illustrates incidence angles of light beams for an existing technology in the form corresponding to FIG. 5A.

As illustrated in FIG. 5A, the telecentric lens 140 allows light beams to be incident on the light receiving surfaces of the light receiving elements (TOF sensor device 130) from the lens at a uniform incidence angle, which is a small angle with respect to the perpendicular to the light receiving surface, without depending on the angle of view (viewing angle) of the lens. FIG. 5A illustrates the incidence angles of light beams from the outside of the telecentric lens 140 in three cases in an overlapped manner. In either case, incidence angles Ω1 to Ω3 of a light beam from the telecentric lens 140 to the light receiving elements change scarcely.

FIG. 5B illustrates a case where a typical lens is used. FIG. 5B also illustrates the incidence angles of light beams from the outside of the lens in three cases in an overlapped manner. Incidence angles Ω1 to Ω3 of light beams from the lens to the light receiving element, on the other hand, largely differ between the incidence angles of light beams from the outside of the lens to the lens. Specifically, to obtain a large angle of view (viewing angle), the incidence angle of a light beam incident on the light receiving elements also changes largely. In this case, using an interference multilayer film filter having a wavelength range largely dependent on an incidence angle for a narrow wavelength range is extremely impractical.

Modification Example of Embodiment 1

Embodiment 1, in which the telecentric lens 140 and the interference bandpass filter 150 (regardless of whether it has its transmissive wavelength range adjustable) are used in combination in flash LiDAR, has been described thus far. However, the present application is not limited to Embodiment 1.

For example, in flash LiDAR, the telecentric lens 140 may be used in combination with an interference bandpass filter having its transmissive wavelength range adjustable.

As described above, the present modification example differs from Embodiment 1 only in that the interference bandpass filter in the present modification example has its transmissive wavelength range adjustable.

(Interference Bandpass Filter Capable of Adjusting Transmissive Wavelength Range)

Regardless of scanning or flash LiDAR, an infrared semiconductor laser is used as a light source by pulse driving. The peak value of the oscillation wavelength of the semiconductor laser changes due to causes such as a temperature. In the present modification example, a bandpass filter having its transmissive wavelength range adjustable is used to enable wavelength filtering with a narrow line width (for example, wavelength width of 20 nm) in which noise resulting from background light can be reduced even in a wide temperature range.

In the present modification example, as an interference filter formed from a multilayer film, a filter having layers with different thicknesses is used. An example of such a filter is a filter having layers whose thicknesses change continuously from point to point in the filter, and another example is a filter that is non-continuously divided, in the same plane, into multiple sections having different thicknesses. An interference multilayer film filter can control the characteristics of each layer constituting the multilayer film in accordance with the thickness of the layer.

Specifically, the bandpass filter 150 has filter characteristics that differ from point to point in the plane. The optical radar device 100 includes the control unit 160. The control unit 160 controls the position of the bandpass filter 150 on the basis of a signal from a sensor that detects the state of the optical radar device 100. The control unit 160 controls the position of the bandpass filter 150 via an actuator 155.

Here, examples of a sensor that detects the state of the optical radar device 100 include, as described above, the sensor 101 that detects the environmental temperature in the environment in which the optical radar device 100 is installed, and the sensor 111 that detects the temperature of a semiconductor laser device (device included in the light emitting unit 110) that radiates a laser beam.

In the present modification example, a filter having optimal transmittance can be used by controlling, with a mechanical method, the position of a filter that allows light to pass therethrough. Specifically, the above interference filter can be disposed parallel to the light receiving surface of the light receiving system adjacent to the fixed light receiving system, and moved to change the position of the filter within the plane of the filter. Thus, the transmissive wavelength range of the filter can be constantly retained at the optimum.

The direction in which the thickness of layers of the multilayer films varies in the filter, that is, the direction in which the filter is mechanically shifted is preferably the direction of the short sides of the light receiving surface of the light receiving system (direction of the short sides of a light receiving surface having a rectangular shape, or direction in which a smaller number of light receiving elements are arrayed if the light receiving surface is formed from an array of light receiving elements). Thus, the physical size of the filter can be reduced, and the filter characteristics can be easily adjusted throughout the entire front surface of the light receiving surface.

Figure 6A:
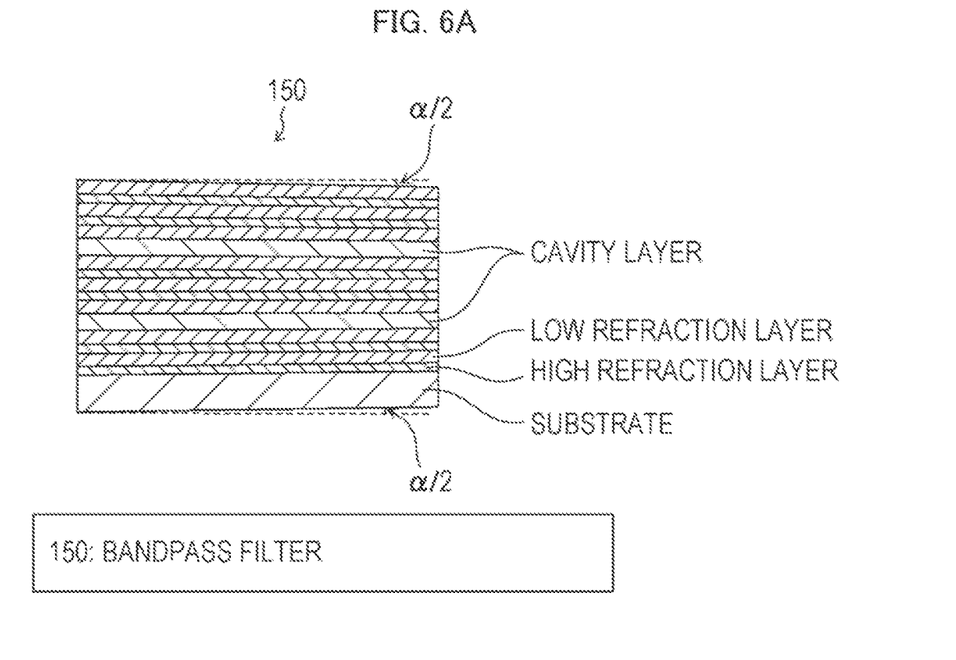
FIG. 6A is a cross-sectional view of one structure example of a bandpass filter constituting the optical radar device in FIG. 1 and FIG. 2.
Figure 6B:
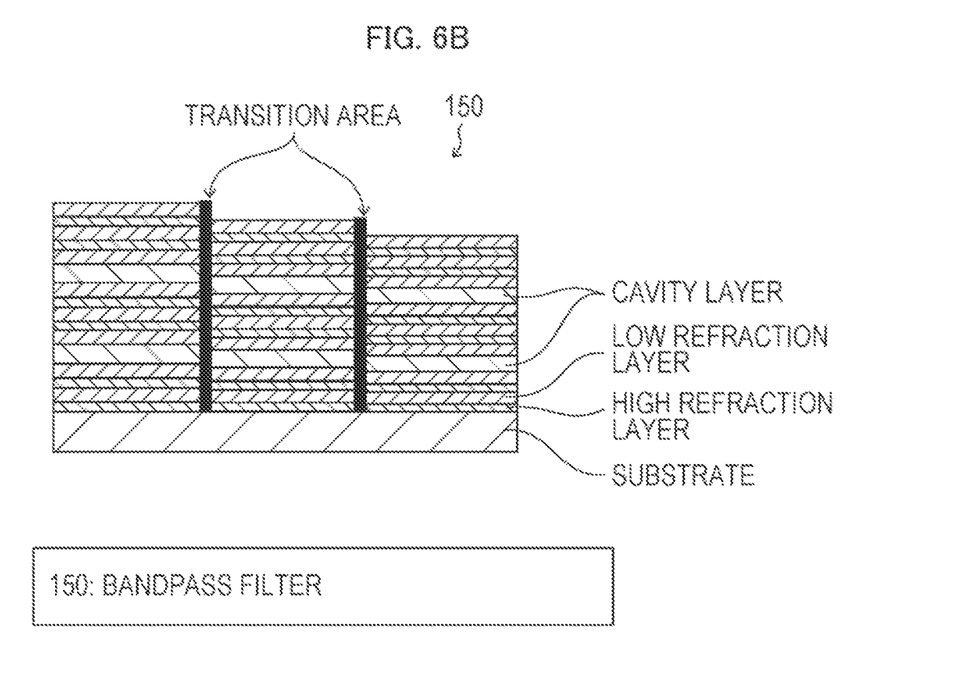
FIG. 6B is a cross-sectional view of another structure example.
Figure 7A:
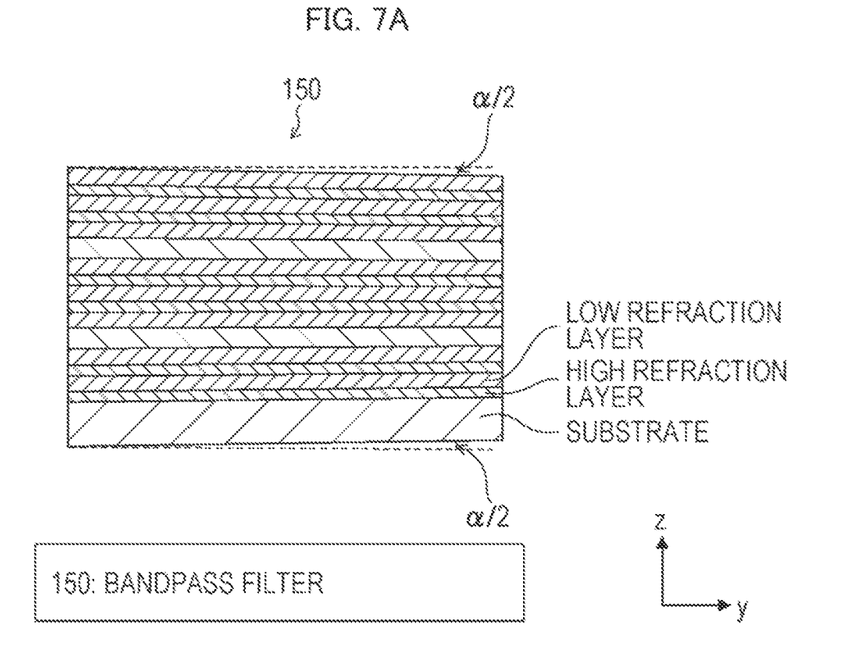
FIG. 7A is a cross-sectional view of one structure example corresponding to FIG. 6A.
Figure 7B:
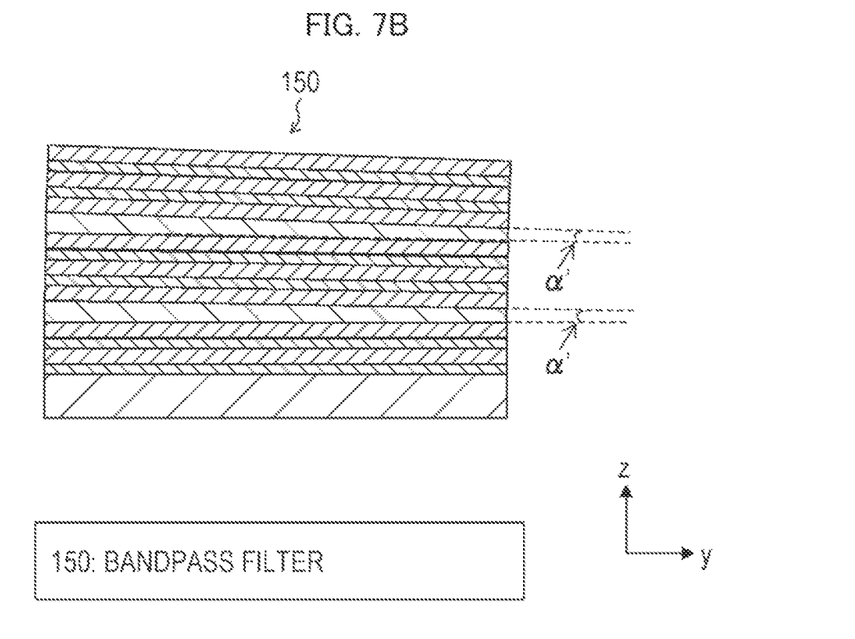
FIG. 7B is a cross-sectional view of another structure example corresponding to FIG. 6A.
Figure 8A:
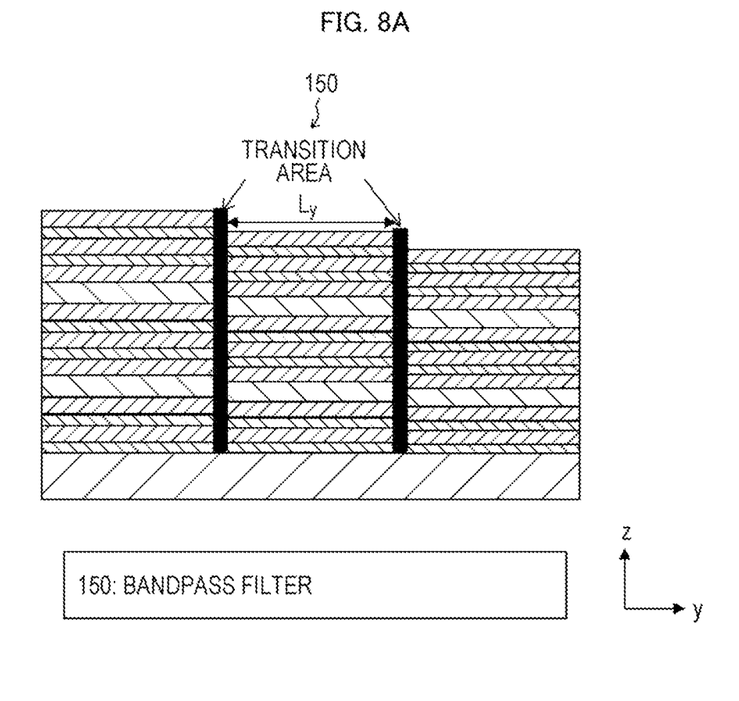
FIG. 8A is a cross-sectional view of one structure example corresponding to FIG. 6B.
Figure 8B:
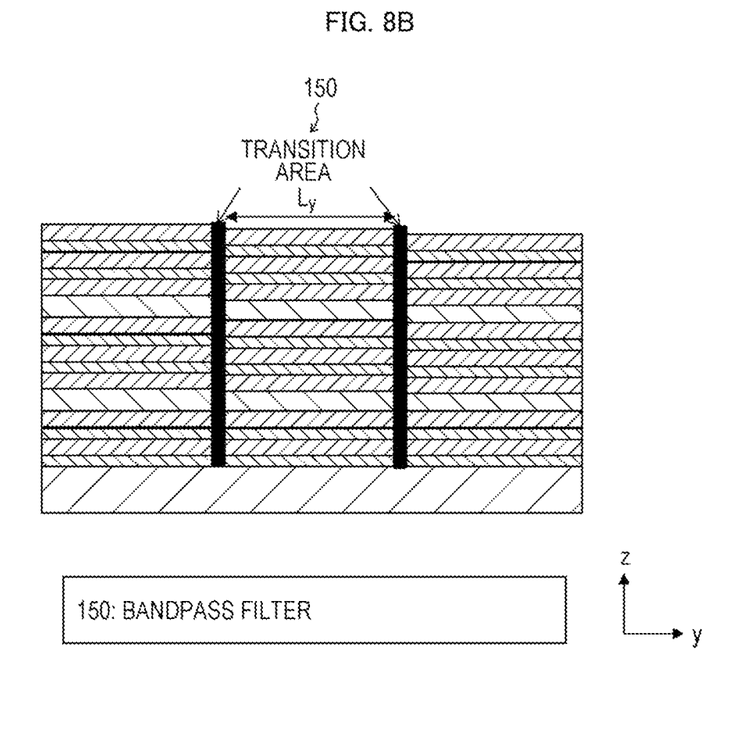
FIG. 8B is a cross-sectional view of another structure example corresponding to FIG. 6B.

Specifically, FIG. 6A is a cross-sectional view of one structure example of the bandpass filter 150 constituting the optical radar device 100 in FIG. 1, and FIG. 6B is a cross-sectional view of another structure example. FIG. 7A is a cross-sectional view of one structure example corresponding to FIG. 6A, and FIG. 7B is a cross-sectional view of another structure example corresponding to FIG. 6A. FIG. 8A is a cross-sectional view of a structure example corresponding to FIG. 6B, and FIG. 8B is a cross-sectional view of another structure example corresponding to FIG. 6B.

As illustrated in FIGS. 6A and 6B, the bandpass filter 150 is formed from a multilayer film including, for example, a substrate layer, a high refraction layer, a low refraction layer, and multiple cavity layers in the ascending order from the bottom. FIGS. 6A and 6B illustrates a structure example where the thickness continuously changes from point to point in the filter.

More specifically, as illustrated in FIG. 7A, for example, in the cross-sectional view of the structure example in FIG. 6A, the thicknesses of all the layers of the multilayer film constituting the filter change at a regular rate. On the other hand, as illustrated in FIG. 7B, only the thickness of the layers that function as cavities, which determine the transmissive wavelength range in the bandpass filter, changes at a regular rate, and the thicknesses of other layers remain the same.

As illustrated in FIG. 8A, the thicknesses of all the layers of the multilayer film constituting the filter change at regular intervals Ly (at transition areas). Here, the thickness in each segment defined by the interval Ly is uniform. The interval Ly determined to be greater than the each light receiving element allows one segment to cover the entirety of the light receiving element when the filter is discontinuously moved to change its position.

On the other hand, as illustrated in FIG. 8B, only the layers of the multilayer film that function as cavities, which determine the transmissive wavelength range, are changed at regular intervals Ly. Here, the thickness in each segment defined by the interval Ly is uniform. The interval Ly determined to be greater than each light receiving element allows one segment to cover the entirety of the light receiving element when the filter is discontinuously moved to change its position.

Specific examples of the interference filter having its transmissive wavelength range adjustable and used as a bandpass filter will be described, below.

Figure 9A:
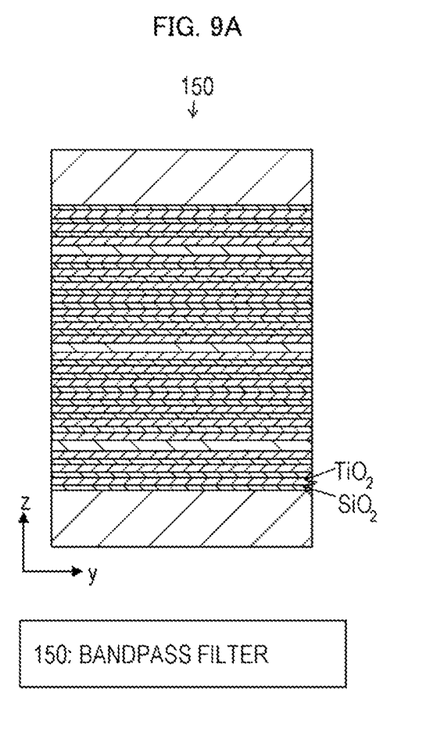
FIG. 9A is a cross-sectional view of a multilayer film constituting a bandpass filter constituting the optical radar device in FIG. 1 and FIG. 2, taken in a cross-sectional direction (z direction).
Figure 9B:
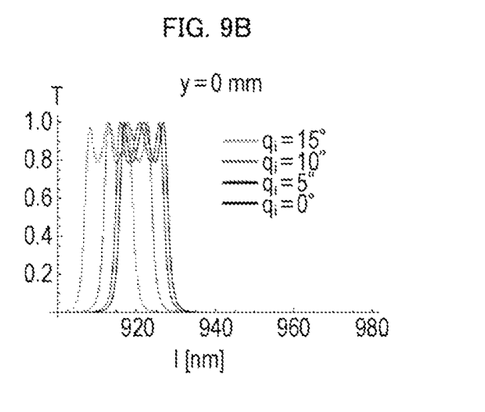
FIG. 9B illustrate dependence of the transmittance of the bandpass filter on an incidence angle $\theta_1$ at positions y in the y direction of 0 mm.
Figure 9C:
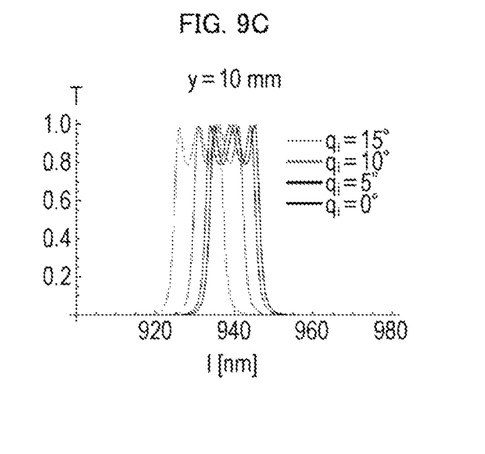
FIG. 9C illustrate dependence of the transmittance of the bandpass filter on an incidence angle $\theta_1$ at positions y in the y direction of 10 mm.
Figure 9D:
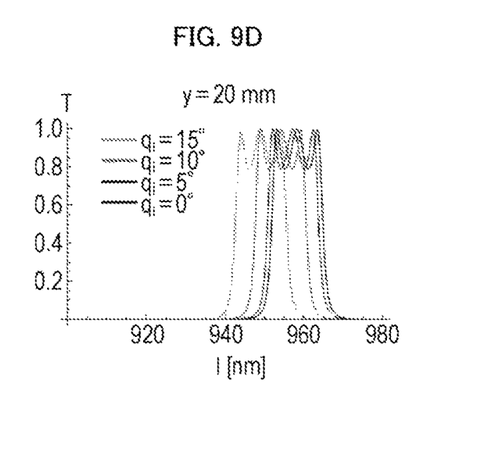
FIG. 9D illustrate dependence of the transmittance of the bandpass filter on an incidence angle $\theta_1$ at positions y in the y direction of 20 mm.

FIG. 9A is a cross-sectional view of a multilayer film constituting a bandpass filter constituting the optical radar device 100 in FIG. 1 taken in a cross-sectional direction (z direction). FIGS. 9B, 9C, and 9D illustrate the dependence of the transmittance of the bandpass filter on an incidence angle $\theta_1$ at the positions y in the y direction of 0, 10, and 20 mm. FIGS. 9A, 9B, 9C, and 9D illustrates an example of a filter having a structure in which the thickness of each layer is continuously changed in one direction (y direction) in the plane of the filter (x-y plane).

The filter is formed from a multilayer film formed by alternately laminating $TiO_2$ and $SiO_2$. The thickness changes in the y direction at the change rate of $\gamma=0.002$ mm$^{-1}$. Specifically, the thickness of each layer in the y direction is expressed by the following formula:

$$t(y)=t(0)\times(1-\gamma y).$$

As illustrated in FIGS. 9A, 9B, 9C, and 9D, the full width at half maximum (FWMH) of the transmissive wavelength range of the filter is approximately 20 nm. FIGS. 9A, 9B, 9C, and 9D reveals that sliding the filter by 20 mm in the y direction can change the transmissive wavelength range by approximately 40 nm or more. The distribution of the transmissive wavelength range within the plane of the light receiving elements formed of a SPAD array can be said as being fully small in consideration of the size (several millimeters) of an actual SPAD array device.

Thus, the filter characteristics of the bandpass filter 150 change continuously or stepwise in one direction within the plane of the bandpass filter. Specifically, the bandpass filter 150 may be formed from a dielectric multilayer film, and the thickness of at least one layer of the dielectric multilayer film may be changed in the plane. Alternatively, the bandpass filter 150 may be divided into multiple segments, and the segments may have different transmissive wavelength ranges.

More specifically, as illustrated in FIGS. 6A, 7A, and 7B, the thickness of each layer may be continuously changed at a regular rate from point to point in the bandpass filter 150, or as illustrated in FIGS. 6B, 8A, and 8B, the thickness of each layer of the multilayer film constituting the bandpass filter 150 may be changed at regular intervals Ly (at transition areas).

The structure including such an interference filter having its transmissive wavelength range adjustable as a bandpass filter is effective on both scanning LiDAR and flash LiDAR, and enables reduction of noise due to background light. This structure thus obtains an effect of improving the distance measurement accuracy or increasing the measurement distance.

On the other hand, in flash LiDAR in which a laser beam is diffusively used, the amount of light reflected off a measurement target is low. Thus, using the interference filter according to the present application having its transmissive wavelength range adjustable as a bandpass filter is particularly effective.

In addition, using the above-described telecentric lens as an image-formation optical system and inserting the interference filter having its transmissive wavelength range adjustable into the appropriate position are particularly preferable in view of improvement of the distance-measuring performance in flash LiDAR.

Figure 10:
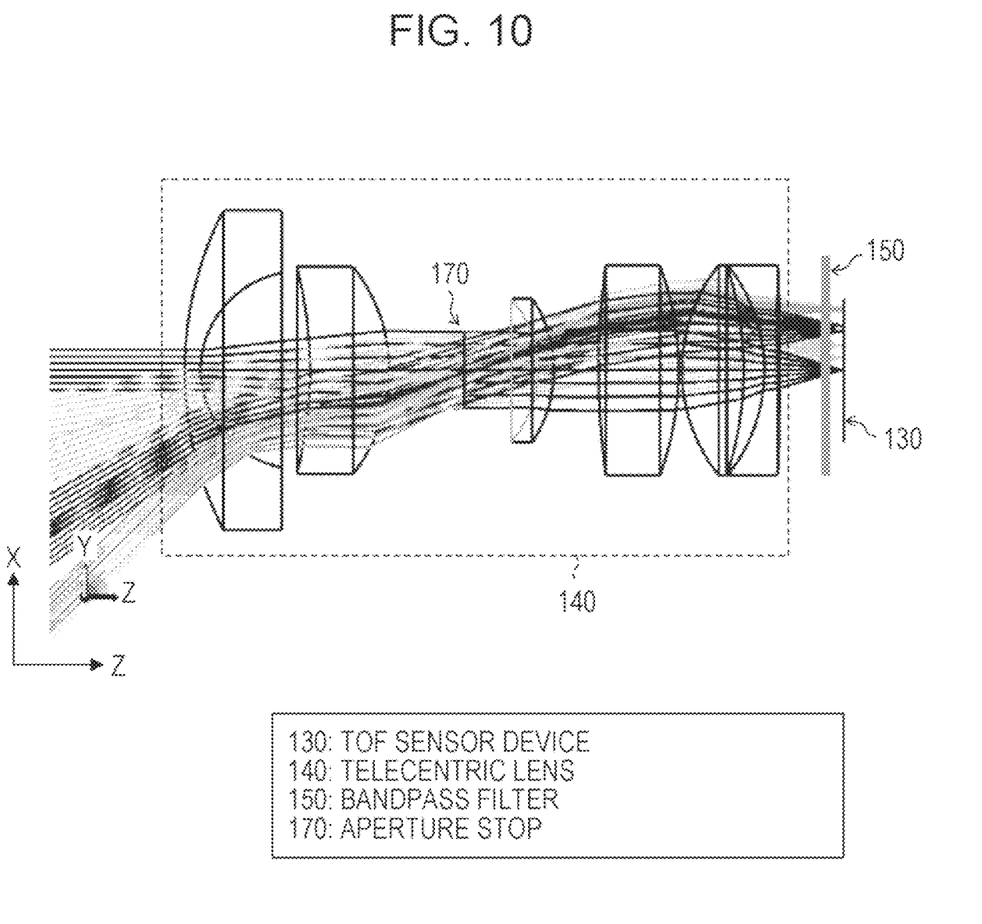
FIG. 10 is a schematic diagram corresponding to FIG. 4A.

FIG. 10 is a schematic diagram corresponding to FIG. 4A. FIG. 10 illustrates a light receiving unit for flash LiDAR including the above-described telecentric lens 150, and, as described above, the interference bandpass filter having its transmissive wavelength range adjustable and disposed at a position at which a light beam is incident at an extremely small angle.

As described above, the filter used here includes a multilayer film having layers each having a thickness that differs from point to point, and the filter is movable.

Figure 11:
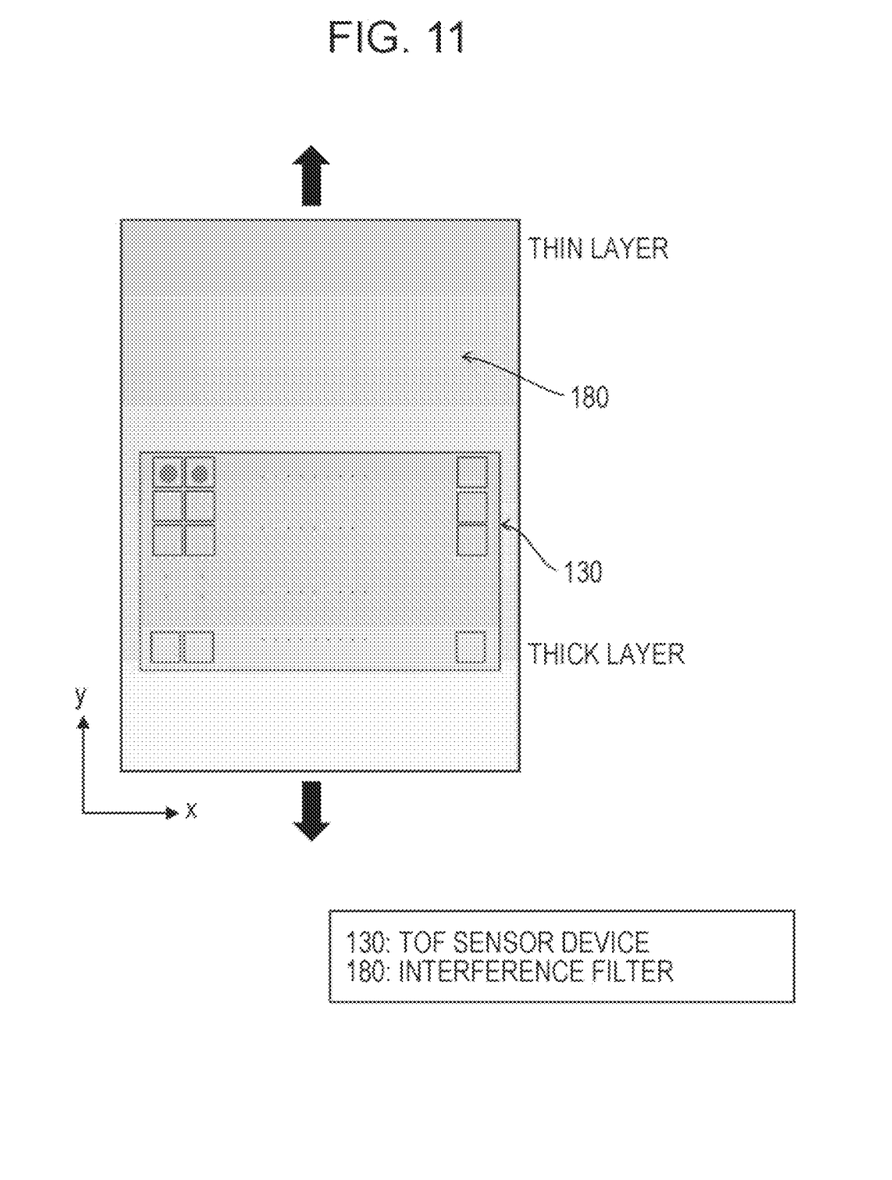
FIG. 11 is a schematic diagram of an arrangement of a bandpass filter constituting the optical radar device in FIG. 1 and FIG. 2.

The interference filter having its transmissive wavelength range adjustable is disposed in the arrangement illustrated in FIG. 11. Specifically, the filter is disposed on the light receiving system formed from an SPAD array to be parallel to the light receiving surface. The SPAD array has its light receiving surface arranged in a rectangle. The filter is physically movable parallel to the short side direction (vertical direction in FIG. 11) of the rectangle.

In FIG. 11, the filter is greater than the light receiving surface of the SPAD array. A filter formed from a thin multilayer film is disposed on an upper side in FIG. 11, and a filter formed from a thick film is disposed on a lower side in FIG. 11. The filter formed from a thin multilayer film has a transmissive wavelength range of a short wavelength, and the filter formed from a thick multilayer film has a transmissive wavelength range of a long wavelength.

For example, a signal from the sensor is a signal representing the environmental temperature of the environment in which the optical radar device is installed. Alternatively, for example, the signal from the sensor may be a signal representing the temperature of the semiconductor laser device that radiates a laser beam.

In flash LiDAR, the environmental temperature of the surroundings or the temperature of a laser device of a light source is constantly (or intermittently) monitored, and controlled by a servomotor (an example of an actuator) to keep the filter to be always positioned as appropriate so that the filter having an appropriate transmissive wavelength range overlaps the light receiving elements in accordance with the change of the oscillation wavelength of the laser due to a temperature change.

As illustrated in FIGS. 7A and 7B to FIGS. 8A and 8B, the thickness of each layer of the multilayer film constituting the bandpass filter 150 gradually decreases in the y direction. Thus, as illustrated in FIGS. 9A, 9B, 9C, and 9D, when the control unit 160 moves the bandpass filter 150 in the y direction using the actuator 155, the transmissive wavelength range shifts in the long wavelength direction.

Generally, the oscillation wavelength of the semiconductor laser increases with a rise of the device temperature or the environmental temperature. Thus, when the sensor 101 or the sensor 111 detects a rise of the temperature, the control unit 160 may move the bandpass filter 150 using the actuator 155 in such a direction as to increase the y-coordinate in the used area in the bandpass filter 150.

Embodiment 2

Another embodiment of the present invention will be described, below. For illustration purposes, components having the same function as the components described in the embodiment are denoted with the same reference signs without being repeatedly described.

Thus far, Embodiment 1, in which the telecentric lens 140 and the interference bandpass filter 150 (regardless of whether it has its transmissive wavelength range adjustable) are used in combination in flash LiDAR, and a modification example of Embodiment 1, in which the telecentric lens 140 and the interference bandpass filter 150 having its transmissive wavelength range adjustable are used in combination in flash LiDAR, have been described. However, the present application is not limited to Embodiment 1 and the modification example of Embodiment 1.

For example, an interference bandpass filter having its transmissive wavelength range adjustable may be used also in scanning LiDAR.

Figure 2:
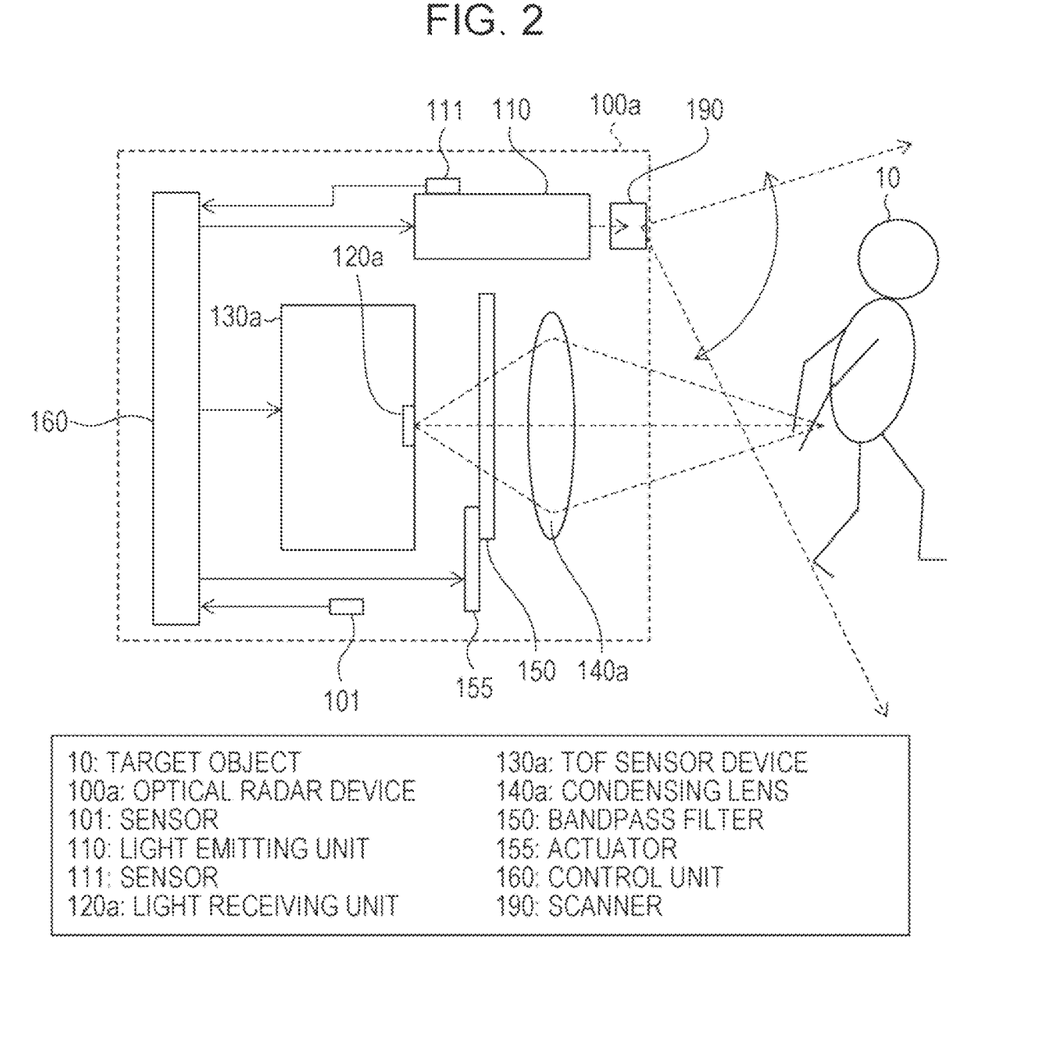
FIG. 2 is a block diagram of related components of an optical radar device according to Embodiment 2 of the present invention.

FIG. 2 is a block diagram of related components of an optical radar device 100a according to the present embodiment. The present embodiment mainly differs from Embodiment 1 and the modification example of Embodiment 1 in that the present embodiment does not include a telecentric lens, but includes an interference bandpass filter having its transmissive wavelength range adjustable.

(Related Components of Optical Radar Device)

FIG. 2 is a block diagram of related components of the optical radar device 100a according to the present embodiment. As illustrated in FIG. 2, the optical radar device 100a includes a light emitting unit 110, a scanner 190, and a light receiving system.

The light emitting unit 110 radiates a laser beam to a target object whose range is to be determined including a movable target, such as people and animals, and an immovable target, such as buildings and trees. In this manner, the present embodiment is applicable to scanning LiDAR in which the light emitting unit 110 radiates a laser beam while the scanner 190 scans the target with the laser beam.

The light receiving system receives the laser beam emitted from the light emitting unit 110 and reflected off the target object 10. In the present embodiment, as illustrated in FIG. 2, the light receiving system includes a condensing lens 140a, a bandpass filter 150, a light receiving unit 120a, and a TOF sensor device 130a. The light receiving unit 120a includes a single light receiving element.

The bandpass filter 150 is disposed between the target object 10 and the light receiving element. The bandpass filter 150 has filter characteristics that differ from point to point in the plane. The light receiving system includes a control unit 160 that controls the position of the bandpass filter on the basis of the signal from a sensor that detects the state of the optical radar device 100a.

The bandpass filter 150 according to the present embodiment has filter characteristics illustrated in or described with reference to FIG. 1 and FIGS. 4A and 4B to FIGS. 8A and 8B.

As illustrated in FIG. 2, the control unit 160 receives measurement signals from a sensor 101 and a sensor 111. For example, the sensor 101 detects the environmental temperature in the environment in which the optical radar device 100a is installed, and the sensor 111 detects the temperature of the semiconductor laser device (included in the light emitting unit 110) that radiates a laser beam.

As illustrated in FIG. 2, as in the case of Embodiment 1 and the modification example of Embodiment 1, the control unit 160 controls the position of the bandpass filter 150 using an actuator 155.

In the above structure, in scanning LiDAR, using a bandpass filter having its transmissive wavelength range adjustable enables noise reduction.

Example Implemented by Software

A control block (particularly, the control unit 160) of the optical radar device 100 or 100a may be implemented by a logical circuit (hardware) formed on, for example, an integrated circuit (IC chip) or implemented by software.

In the latter case, the optical radar device 100 or 100a includes a computer that executes instructions of a program, which is software that implements each function. The computer includes, for example, at least one processor (control device), and includes at least one computer-readable recording medium storing the program. When the processor in the computer reads the program from the recording medium and executes the program, the object of the present invention is achieved. Examples usable as the processor include a central processing unit (CPU). Examples usable as the recording medium include "a nontemporary tangible medium", such as read-only memory (ROM), a tape, a disk, a card, a semiconductor memory, or a programmable logical circuit. The recording medium may also include random-access memory (RAM) in which the program is expanded. The program may be fed to the computer via any transmission medium (such as communication network or broadcast wave) capable of transmitting the program. An embodiment of the present invention may be achieved in the form of a data signal embedded in a carrier wave, which is an embodiment of the program through electronic transmission.

The present invention is not limited to the above described embodiments, and can be changed in various manners within the scope of Claims. Embodiments obtained by appropriately combining technical devices disclosed in different embodiments are also included in the technical scope of the present invention. Combining technical devices disclosed in the embodiments enables formation of new technical features.

REFERENCE SIGNS LIST 10 target object
100, 100a optical radar device
110 light emitting unit
120 arrayed light receiving unit
120a light receiving unit
130, 130a TOF sensor device
140 telecentric lens
140a condensing lens
150 bandpass filter
155 actuator (servomotor)
160 control unit
190 scanner

The invention claimed is:

1. An optical radar device, comprising:
a light emitting unit that diffusively radiates a laser beam;
a light receiving unit that receives the laser beam that is emitted from the light emitting unit and is reflected off an object having a range to be determined, the light receiving unit including light receiving elements arrayed two-dimensionally;
a telecentric lens disposed between the object having the range to be determined and the light receiving element; and
a bandpass filter disposed closer to the light receiving elements than the telecentric lens,
wherein the bandpass filter transmits the laser beam of a wavelength that differs from point to point in a plane of the bandpass filter,
wherein the optical radar device further comprises a control circuit that controls a position of the bandpass filter on a basis of a signal from a sensor that detects a state of the optical radar device,
wherein the light receiving elements are arrayed in rows and columns of a two-dimensional matrix in the light receiving unit such that the light receiving elements arrayed in the rows differ in number from the light receiving elements arrayed in the columns, and
wherein the bandpass filter transmits the laser beam of the wavelength that differs from point to point along a direction in which a smaller number of the light receiving elements are arrayed.

2. The optical radar device according to claim 1, wherein the signal from the sensor is a signal representing an environmental temperature of an environment in which the optical radar device is installed.

3. The optical radar device according to claim 1, wherein the signal from the sensor is a signal representing a temperature of a semiconductor laser device of the light emitting unit that radiates the laser beam.

4. The optical radar device according to claim 1,
wherein the wavelength of the laser beam transmitted by the bandpass filter changes continuously or stepwise in one direction in the plane of the bandpass filter.

5. The optical radar device according to claim 1,
wherein the bandpass filter is divided into a plurality of segments that have different transmissive wavelength ranges.

6. The optical radar device according to claim 1,
wherein the bandpass filter is formed from a dielectric multilayer film including layers, at least one of which has a thickness that changes in the plane.

7. An optical radar device laser, comprising:
a light emitting unit that radiates a laser beam;
a light receiving unit that receives the laser beam that is emitted from the light emitting unit and is reflected off an object having a range to be determined, the light receiving unit including a light receiving element; and
a bandpass filter disposed between the object having the range to be determined and the light receiving element,
wherein the bandpass filter transmits the laser beam of a wavelength that differs from point to point in a plane of the bandpass filter, and
wherein the optical radar device further comprises a control circuit that controls a position of the bandpass filter on a basis of a signal from a sensor that detects a state of the optical radar device,
wherein the light receiving unit has a surface in a shape of a rectangle facing toward the laser beam, and
wherein the bandpass filter transmits the laser beam of the wavelength that differs from point to point along a short side direction of the rectangle.

* * * * *